US010326327B2

(12) United States Patent
Ribot et al.

(10) Patent No.: US 10,326,327 B2
(45) Date of Patent: Jun. 18, 2019

(54) CLAW ROTOR COMPRISING CLIP FOR SECURING END WIRE OF WINDING, AND ASSOCIATED ELECTRICAL MACHINE

(71) Applicant: VALEO EQUIPEMENTS ELECTRIQUES MOTEUR, Creteil (FR)

(72) Inventors: Herve Ribot, Peronne (FR); Daniel Hirsou, Rang du Flier (FR); Pascal Leborgne, Beutin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 693 days.

(21) Appl. No.: 14/909,188

(22) PCT Filed: Jul. 21, 2014

(86) PCT No.: PCT/FR2014/051872
§ 371 (c)(1),
(2) Date: Feb. 1, 2016

(87) PCT Pub. No.: WO2015/015089
PCT Pub. Date: Feb. 5, 2015

(65) Prior Publication Data
US 2016/0164367 A1    Jun. 9, 2016

(30) Foreign Application Priority Data
Aug. 1, 2013 (FR) ...................................... 13 57619

(51) Int. Cl.
*H02K 1/00* (2006.01)
*H02K 3/50* (2006.01)
(Continued)

(52) U.S. Cl.
CPC ............... *H02K 3/50* (2013.01); *H02K 1/243* (2013.01); *H02K 3/28* (2013.01); *H02K 3/38* (2013.01); *H02K 9/04* (2013.01); *H02K 13/02* (2013.01)

(58) Field of Classification Search
CPC ............ H02K 3/50; H02K 13/02; H02K 3/28; H02K 9/04
(Continued)

(56) References Cited

U.S. PATENT DOCUMENTS 5,270,605 A    12/1993  Lefrancois et al.
6,114,786 A *   9/2000  Ishida .................... H02K 3/528
                                                        310/194

(Continued)

FOREIGN PATENT DOCUMENTS

EP    0515259    11/1992
EP    0994552     4/2000
(Continued)

*Primary Examiner* — Hanh N Nguyen
(74) *Attorney, Agent, or Firm* — Berenato & White, LLC

(57) ABSTRACT

A claw pole rotor comprises a shaft, first and second polar wheels fastened to the shaft, a winding provided with a winding insulator and surrounded by the first and second polar wheels, a commutator provided with at least one commutator ring, a fan fastened to the first polar wheel and disposed between the winding and the at least one commutator ring, at least one end-of-winding wire being linked to one of the at least one commutator rings, passing through a radial cavity provided between the fan and the first polar wheel. The winding insulator comprises a clip retaining the one end-of-winding wire. The retaining clip is fastened to the winding insulator and comprising crimping means intended to be disposed in the radial cavity to crimp the part of the end-of-winding wire extending into the radial cavity.

20 Claims, 5 Drawing Sheets

(51) Int. Cl.
*H02K 13/02* (2006.01)
*H02K 1/24* (2006.01)
*H02K 3/28* (2006.01)
*H02K 3/38* (2006.01)
*H02K 9/04* (2006.01)

(58) Field of Classification Search
USPC .......................................... 310/194, 261, 263
See application file for complete search history.

(56) References Cited

U.S. PATENT DOCUMENTS

| | | | |
|---|---|---|---|
| 6,501,207 B2 * | 12/2002 | Oohashi | H02K 13/02 |
| | | | 310/232 |
| 6,847,138 B2 * | 1/2005 | York | H02K 3/528 |
| | | | 29/598 |
| 2009/0026854 A1 | 1/2009 | An et al. | |
| 2009/0236926 A1 | 9/2009 | Tokizawa | |

FOREIGN PATENT DOCUMENTS

| | | |
|---|---|---|
| FR | 2818823 | 6/2002 |
| FR | 2932325 | 12/2009 |

\* cited by examiner

CLAW ROTOR COMPRISING CLIP FOR SECURING END WIRE OF WINDING, AND ASSOCIATED ELECTRICAL MACHINE

CROSS-REFERENCE TO RELATED APPLICATIONS AND CLAIM TO PRIORITY

This application is a national stage application of International Application No. PCT/FR2014/051872 filed Jul. 21, 2014, which claims priority to French Patent Application No. 1357619 filed Aug. 1, 2013, the disclosures of which are incorporated herein by reference and to which priority is claimed.

FIELD OF THE INVENTION

The invention relates to a claw rotor comprising a clip for securing an end wire of the winding, as well as an associated electrical machine comprising a claw rotor of this type.

More particularly, the invention relates to the field of rotary electrical machines such as alternators, or alternator-starters and electromagnetic retarders.

BACKGROUND OF THE INVENTION

The term "claw rotor" designates a rotor of a rotary electrical machines, the poles of which are in the form of claws. A rotor of this type is composed of two opposite imbricated magnet wheels, each comprising claws. Each claw of a magnet wheel extends in the direction of the other magnet wheel, and is inserted between two consecutive claws of the opposite magnet wheel. The claw rotor comprises magnetised parts, and the excitation winding is wound around the rotational shaft of the machine.

The rotor is arranged inside a stator. When the rotary electrical machine is functioning, the rotor rotates around its axis, and the magnetic flux circulates between the adjacent magnetic poles with respective opposite polarities, passing via the windings of the stator. The magnets disposed between the magnetic poles constituted by the claws are used to prevent the magnetic flux from passing directly from one pole to the other, without passing via the stator.

Document FR 2 932 325 describes an electrical machine which is particularly suitable for motor vehicles, provided with a claw rotor with interpolar magnetic assemblies comprising magnets, which have both a reduced size, and are secured in lateral grooves in the polar claws. Document FR 2 818 823 describes a means for producing the winding of the excitation winding of a claw rotor.

Generally, fans are fitted around the rotational shaft on both sides of the magnet wheels, in order to cool the winding.

The excitation winding of a claw rotor comprises two end wires connected to collector rings, on which brushes rub in order to supply the excitation winding. Each end wire is bent at the top of the winding, and passes through a radial cavity provided between a wall of a magnet wheel and a recess in the fan, and an axial cavity provided between the shaft and a recess in the fan.

During functioning of the rotary electrical machine, the end wire is subjected to substantial vibrations which give rise to premature breakage of the wire at the bend.

SUMMARY OF THE INVENTION

The objective of the invention is in particular to eliminate this disadvantage of the prior art.

For this purpose, the invention relates to a claw rotor comprising a shaft, a first and a second magnet wheel which are secured on the said shaft, a winding which is provided with a coil insulator, and is surrounded by the said first and second magnet wheels, a collector which is provided with at least one collector ring, a fan which is secured on the first magnet wheel, and is disposed between the winding and the at least one collector ring, at least one end wire of the winding being connected to one of the said at least one collector rings, and passing through a radial cavity provided between the fan and the first magnet wheel, the claw rotor comprising a clip for securing one of the said at least one end wires of the winding, the said securing clip being secured on the said coil insulator, and comprising crimping means which are designed to be disposed in the radial cavity, in order to crimp the part of the end wire of the winding which extends in the said radial cavity, and the said securing clip comprising means for support on the wall of the radial cavity, such that the crimping means clamp the end wire of the winding when the crimping means are disposed in the said radial cavity.

The securing clip makes it possible to limit the vibrations of the end wire, thus reducing the risks of breakage of the end wire.

Advantageously, the radial cavity is formed by a recess in the first magnet wheel.

As a variant, the radial cavity is formed by a recess in the fan.

Advantageously, the recess is in the form of a radial tunnel.

Advantageously, the crimping means comprise an opening in order to insert the part of the end wire to be crimped and the support means comprise a protuberance which extends from the opening in the direction of the wall of the fan.

Advantageously, the crimping means comprise a solid edge, and the support means comprise a reinforcement protuberance which extends from the solid edge, in the direction of the wall of the fan.

The fan thus applies a constraint on the clip, in order to retain the end wire. The reinforcement protuberance makes it possible to reinforce the strength of the securing clip, in particular for the phases of fitting or removal of the end wire into or from the securing clip.

Advantageously, the protuberance has a length such that it interferes with the wall of the fan, which, during the arrangement of the crimping means in the said radial cavity, gives rise to pivoting of the said crimping means relative to the wall of the fan, such that the two protuberances of the support means come into contact with the wall of the fan.

Advantageously, the crimping means comprise a lower face which is in contact with the wall of the first magnet wheel, and an upper face which is in contact with the wall of the fan, and on which the said support means are arranged, the said support means permitting retention of the crimping means between the wall of the first magnet wheel and the wall of the fan, and gripping of the wire between the two faces of the crimping means.

Advantageously, the width of the space free of material between the two, lower and upper faces is slightly larger than the diameter of the end wire.

Advantageously, the upper face is connected to the lower face by a solid edge and an insertion edge.

Advantageously, the insertion edge comprises an opening, the size of which is smaller than the diameter of the end wire, the said crimping means being able to be deformed in order to increase the size of the said opening.

Advantageously, the insertion edge comprises a part which is bevelled at the opening, the bevelled part forming a widening of the opening in the direction of the introduction of the end wire to be crimped.

Preferably, the insertion edge comprises two bevelled parts facing one another.

Advantageously, the securing clip is connected by securing means to the said coil insulator, and comprises a bending line which is disposed between the said securing means and the said crimping means. The bending line makes it possible to anticipate the bending of the securing clip, and to improve its positioning between the magnet wheel and the fan.

Advantageously, the securing clip is made of a plastic and resilient material, for example a flexible polyamide plastic. This embodiment covers the needs for flexure of the insertion edge, and makes possible a controlled production process.

Advantageously, the said securing clip has an axial orientation in the free state, and is bent according to the said bending line in the fitted state, when the crimping means are disposed in the said radial cavity.

The invention also relates to an electrical machine comprising a claw rotor according to the invention.

BRIEF DESCRIPTION OF THE DRAWINGS

The invention will be better understood by reading the following description and examining the figures which accompany it. These figures are provided purely by way of illustration of the invention, which is in no way limiting. They show.

The elements which are identical, similar or analogous retain the same reference from one figure to another.

DETAILED DESCRIPTION OF THE PREFERRED EMBODIMENT(S)

The invention relates to a securing clip 11 for a rotary electrical machine 10, in particular an alternator or an alternator-starter. This machine 10 is preferably designed to be implemented in a motor vehicle.

An alternator-starter is a rotary electrical machine which can work reversibly, firstly as an electric generator when functioning as an alternator, and secondly as an electric motor, in particular in order to start the thermal engine of a motor vehicle.

Figure 1:
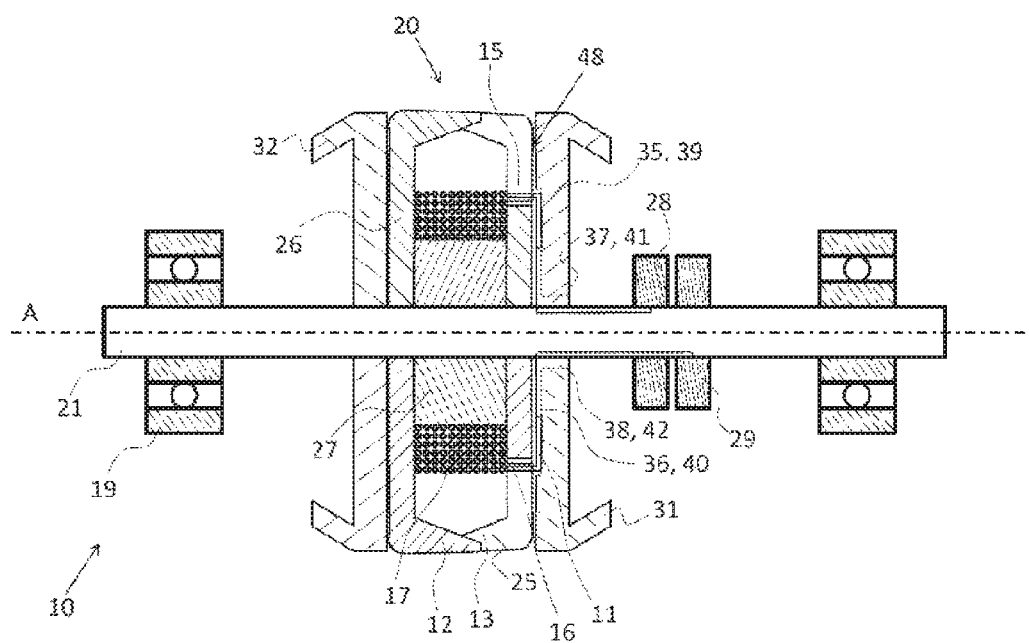
FIG. 1 is a view in axial cross-section of a rotary electrical machine provided with a securing clip according to a first embodiment of the invention.

FIG. 1 represents schematically an electrical machine 10 provided with a claw rotor 20 secured on a drive shaft 21 with an axis A. The shaft 21 is fitted free in rotation relative to a stator (not represented) by means of bearings 19.

Figure 2:
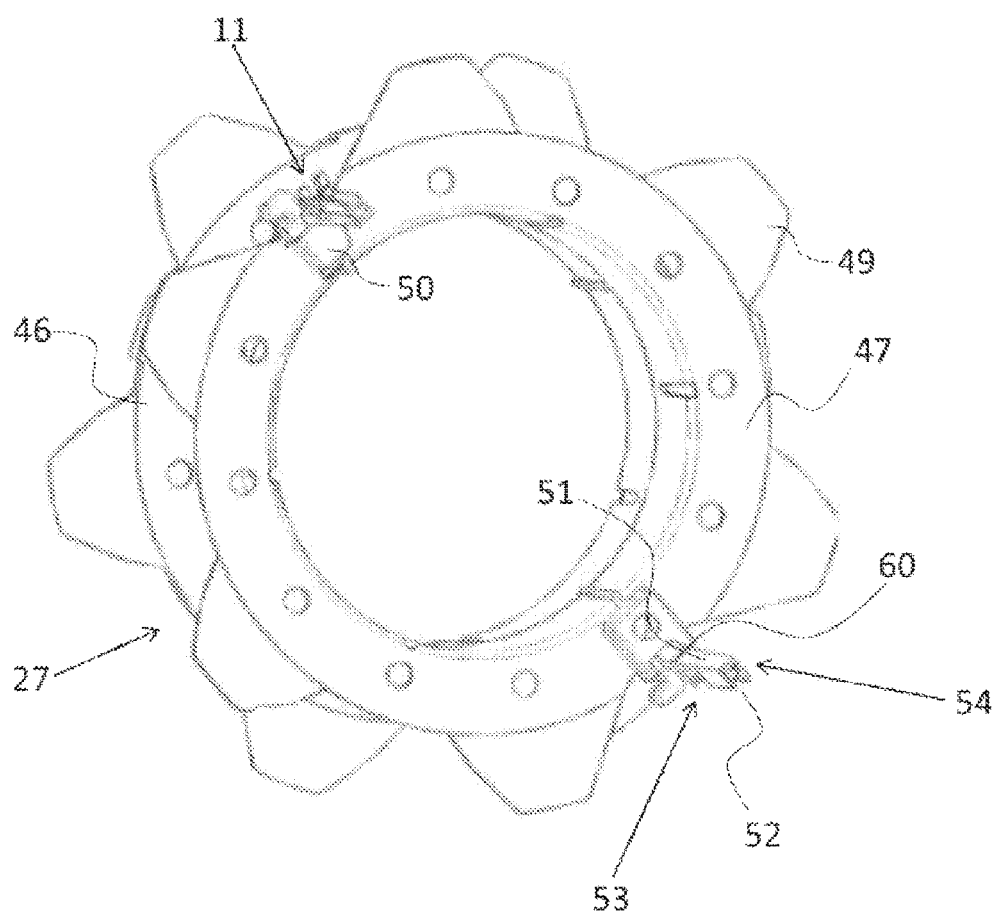
FIG. 2 is a view in perspective of an excitation coil insulator of the claw rotor in FIG. 1, before the assembly step.

FIG. 2 represents a coil 17 insulator 27. This insulator is substantially cylindrical, and is fitted integrally in rotation on the central section of the shaft 21, and is clamped axially between two magnet wheels 25, 26. This coil insulator acts as an excitation winding support for the claw rotor. It makes it possible to insulate the rotor winding. According to a known design, each of the magnet wheels 25, 26 comprises a series of claws 12, 13, of which there are for example twelve for each of the magnet wheels 25, 26, and which are distributed angularly regularly around the axis A which is common to the magnet wheels 25, 26 and to the shaft 21.

Each of the magnet wheels 25, 26 comprises claws respectively 13 and 12. Each of the claws 12, 13 of a magnet wheel 26, 25 extends axially towards the other magnet wheel 25, 26 opposite, such that the claws 12, 13 are imbricated in one another. Document EP-B-515.259 discloses further details of the other components of the alternator.

According to this embodiment, two fans 31, 32 are fitted integrally around the shaft 21, and are secured on the magnet wheels 25, 26 in order to facilitate the circulation of the air in the electrical machine which comprises the rotor.

The winding 17 is produced by winding turns of an electrically conductive wire, such as a copper wire, so as to form layers of conductive wire which are superimposed radially. The conductive wire is covered with at least one layer of electrically insulating material. The winding 17 comprises two end wires 15, 16 connected to a collector provided with two collector rings 28, 29, on which brushes rub in order to supply the winding 17. The connection between the end wires 15 and 16 and the collector rings 28, 29 respectively is produced as can be seen in FIG. 1 by conductive plates which are disposed in recesses in the shaft 21. Each end wire 15, 16 is bent at the top of the winding 17, and passes through a radial cavity 35, 36 provided between the first magnet wheel 25 and the fan 31, then is connected to the said conductive plates. Passages 37 and 38 are provided between the shaft 21 and the fan 31. The passages 37, 38 are formed by recesses 41, 42 in the fan 31.

In the case of FIGS. 1 to 4, the radial cavities 35, 36 are formed by recesses 39, 40 in the fan 31, with each recess 39, 40 forming a radial tunnel. On the other hand, in the case of FIG. 5, the radial cavities 35, 36 are formed by recesses in the first magnet wheel 25.

A securing clip 11 retains each end wire 15, 16 in the radial cavity 35, 36, between the first magnet wheel 25 and the fan 31. The securing clip 11 comprises a securing device 50 for securing on the coil 17 insulator 27, as well as crimping device which extend in the radial cavity 35, 36, and a support device for support on the crimping device, against a wall 48 of the first magnet wheel 25.

FIG. 2 shows the detail of the coil insulator on which the two securing clips 11 are secured. The winding insulator 27 comprises petals 49 (which cannot be seen in FIG. 1), designed to be folded after the winding wire 17 has been put into place between two rings 46, 47.

Each securing clip 11 comprises a securing device 50 for securing on the insulator 27 formed by a part in the form of a "U", the central space of which is designed to be forced onto the thickness of a ring 47 of the insulator 27. The securing clip 11 extends axially from the securing device 50, and comprises a bending line 60, such as to be folded onto the first magnet wheel 25 during the assembly of the claw rotor 20. For this purpose, the distance between the bending line 60 and the securing device 50 is adapted to the thickness of the first magnet wheel 25.

Figure 3:
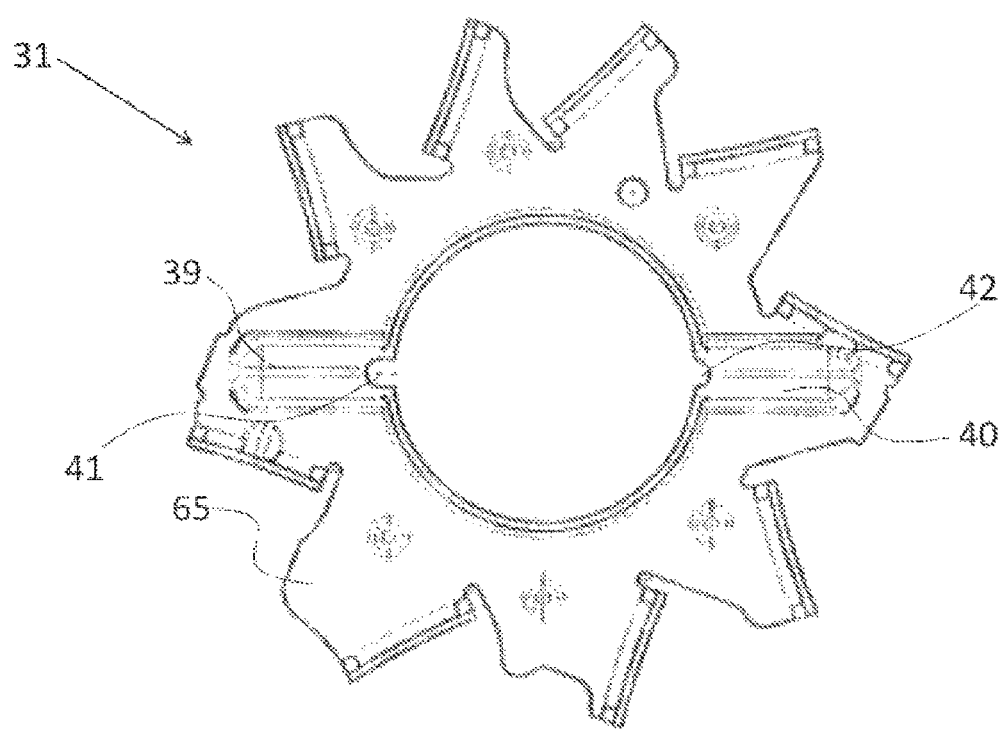
FIG. 3 is a front view of the fan in FIG. 1, before the assembly step.

FIG. 3 shows a front view of the fan 31 provided with blades 65 which can direct the air towards the winding 17 in order to cool it. The fan 31 also comprises two radial recesses 39, 40, which are designed to form radial cavities 35, 36 between the wall 48 of the first magnet wheel 25 and the fan 31. Each radial recess 39, 40 has the form of a vault, and a depth which is designed for the securing clip 11. The fan 31 also comprises two axial recesses 41, 42 with a semi-circular form, the radius of which is larger than the radius of the end wire 15, 16. Each axial recess 41, 42 is designed to form the axial cavities 37, 38 for the passage of an end wire 15, 16.

Figure 4:
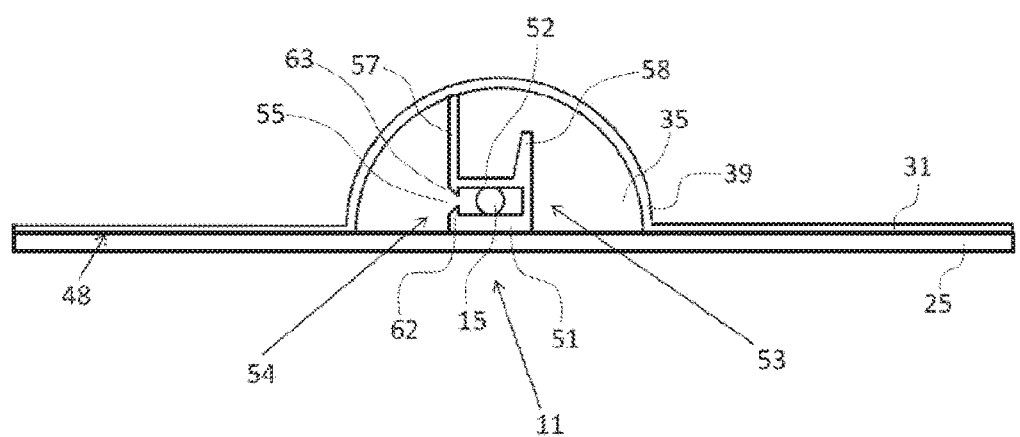
FIG. 4 is a view in radial cross-section of the securing clip in FIG. 1, fitted between a magnet wheel and the fan.

FIG. 4 shows an embodiment of the support device 50 and of the crimping device for crimping the securing clip 11. The securing clip 11 is represented in its working position, encompassing an end wire 15 in the radial cavity 35 between the wall 48 of the first magnet wheel 25 and the radial recess 39 in the fan 31.

The securing clip comprises a lower face 51 which is in contact with the wall 48 of the first magnet wheel 25, and an upper face 52 opposite the lower face 51. The lower 51 and upper 52 faces are connected by a solid edge 53 and an insertion edge 54. The insertion edge comprises the opening 55 which allows the end wire 15 to be put into place. The distance between the upper face 52 and the lower face 51 is substantially equal to the diameter of the end wire 15. On the other hand, the size of the opening 55 is smaller than the diameter of the end wire 15. The securing clip 11 is deformed in order to increase the size of the opening 55 when the end wire 15 is put into place. Preferably, the securing clip 11 is made of a plastic and resilient material, for example a flexible polyamide plastic.

The insertion edge comprises two bevelled parts 62, 63 opposite one another. The bevelled parts 62, 63 form a narrowing of the opening 55 at the inner wall of the securing clip 11. The bevelled parts 62, 63 thus make it possible to facilitate the putting into place of the end wire 15, and to retain the end wire 15 in the securing clip 11.

The securing clip comprises a reinforcement protuberance 58 which extends from the solid edge 53 in the direction of the recess 39 in the fan 31. The reinforcement protuberance 58 increases the strength of the solid edge 53 and the upper face 52, in order to limit the risks of breakage of the securing clip 11 during its deformation in order to put the end wire 15 into place.

The securing clip 11 also comprises a protuberance 57 which extends between the opening 55 and the recess 39 in the fan 31, such as to maintain pressure on the bevelled part 63 when the fan 31 is fitted on the claw rotor 20. During the assembly of the claw rotor 20, the end wire 15 is inserted in the securing clip 11 by deformation of the securing clip 11. The securing clip is bent according to the bending line 60, such that the lower part 51 is in contact with the wall 48 of the first magnet wheel 25. When the fan 31 is fitted on the claw rotor 20, the protuberance 57 blocks the end wire 15, and prevents the deformations of the securing clip 11, thus permitting the extraction of the end wire 15.

The end wire 15 is thus firmly retained in the radial cavity 35, which limits the risks of breakage of the end wire caused by the vibrations of the electrical machine 10.

Figure 5:
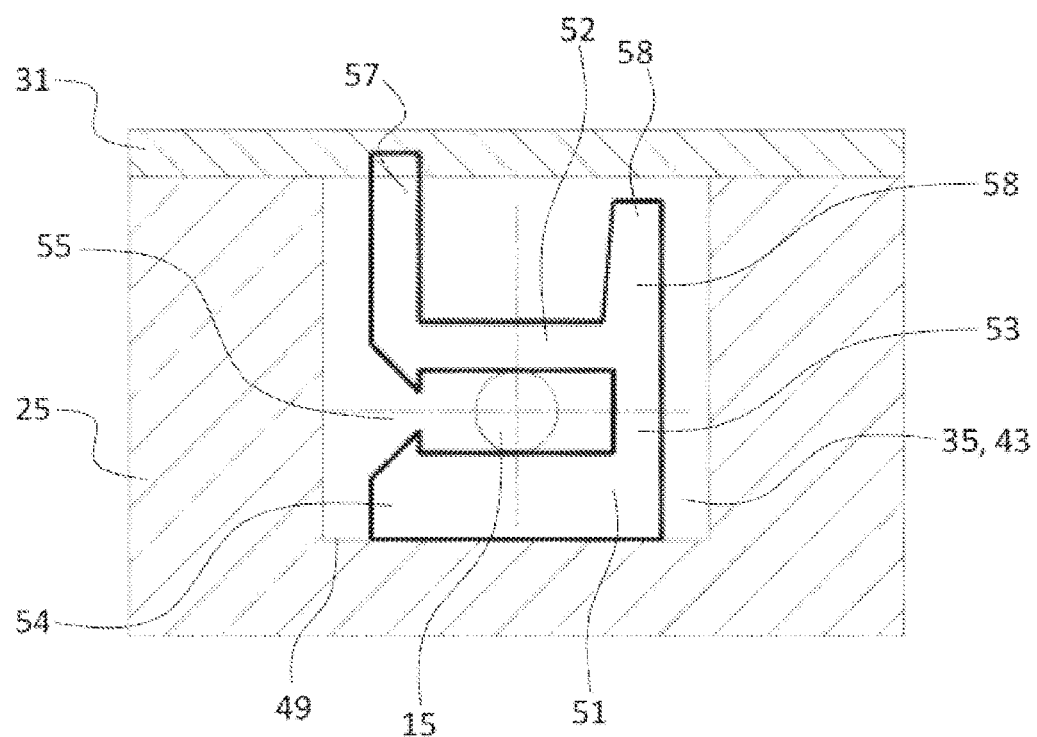
FIG. 5 is a view in radial cross-section of a securing clip of a rotary electrical machine according to a second embodiment of the invention.

FIG. 5 shows a second embodiment of the invention, in which the recess 43 for providing the radial cavity 35 is formed in the first magnet wheel 25. The lower part 51 of the securing clip 11 extends in the base 49 of the recess 43 in the first magnet wheel 25, and the protuberance 57 extends between the opening 55 and a flat face of the fan 31. The recess 43 takes the form of a groove in the form of a "U", the base 49 of which is flat. As a variant, the recess 43 could have other forms, without changing the invention.

The invention claimed is:

1. A claw rotor (20) comprising:
    a shaft (21);
    a first magnet wheel (25) and a second magnet wheel (26) secured on the shaft (21);
    a winding (17) with a coil insulator (27), and surrounded by the first and second magnet wheels (25, 26);
    a collector with at least one collector ring (28, 29);
    a fan (31) secured on the first magnet wheel (25), and disposed between the winding (17) and the at least one collector ring (28, 29);
    at least one end wire (15, 16) of the winding (17) being connected to one of the at least one collector rings (28, 29), and passing through a radial cavity (35, 36) provided between the fan (31) and the first magnet wheel (25);
    a securing clip (11) securing one of the at least one end wires (15, 16) of the winding (17);
    the securing clip (11) being secured on the coil insulator (27), and comprising a crimping device (62, 63) disposed in the radial cavity in order to crimp a part of the at least one end wire (15, 16) of the winding which extends in the radial cavity; and
    the securing clip further comprising a support device (57, 58) for supporting the securing clip on a wall of the radial cavity, such that the crimping device clamps the at least one end wire (15, 16) of the winding when the crimping device is disposed in the radial cavity (35, 36).

2. The claw rotor (20) according to claim 1, wherein the radial cavity is formed by a recess in the first magnet wheel.

3. The claw rotor (20) according to claim 2, wherein the crimping device comprises an opening (55) in order to insert the part of the at least one end wire to be crimped, and wherein the support device (57, 58) comprises a protuberance (57) which extends from the opening (55) of the crimping device in the direction of a wall of the fan (31).

4. The claw rotor (20) according to claim 3, wherein the crimping device comprises a solid edge (53), and wherein the support device (57, 58) further comprises a reinforcement protuberance (58) which extends from the solid edge (53) of the crimping device in the direction of a wall of the fan (31).

5. The claw rotor (20) according to claim 4, wherein the protuberance (57) has a length such that the protuberance (57) interferes with the wall of the fan, which, during the arrangement of the crimping device in the radial cavity, gives rise to pivoting of the crimping device relative to the wall of the fan, such that both the protuberance (57) and the reinforcement protuberance (58) of the support device come into contact with the wall of the fan (31).

6. The claw rotor (20) according to claim 1, wherein the crimping device comprises
    a lower face (51) which is in contact with a wall (48) of the first magnet wheel (25); and
    an upper face (52) which is in contact with the wall of the fan (31), and on which the support device is arranged;
    the support device permitting retention of the crimping device between the wall (48) of the first magnet wheel (25) and a wall of the fan (31), and gripping of the wire between the lower and upper faces (51, 52) of the crimping device.

7. The claw rotor (20) according to claim 6, wherein a width of a space free of material between the lower and upper faces (51, 52) is slightly larger than a diameter of the at least one end wire.

8. The claw rotor (20) according to claim 6, wherein the upper face (52) is connected to the lower face (51) by a solid edge (53) and an insertion edge (54).

9. The claw rotor (20) according to claim 8, wherein the insertion edge (54) comprises an opening (55), a size of which is smaller than a diameter of the at least one end wire (15, 16), and wherein the crimping device is configured to be deformed in order to increase the size of the opening (55).

10. The claw rotor (20) according to claim 8, wherein the insertion edge (54) comprises an opening (55) and a part (62, 63) which is bevelled at the opening (55), and wherein the bevelled part (62, 63) forms a widening of the opening (55) in the direction of the introduction of the at least one end wire to be crimped.

11. The claw rotor (20) according to claim 10, wherein the insertion edge (54) comprises two bevelled parts (62, 63) facing one another.

12. The claw rotor (20) according to claim 1, wherein the securing clip (11) is connected by a securing device (50) to the coil insulator.

13. The claw rotor (20) according to claim 12, wherein the securing clip (11) is made of a plastic and resilient material.

14. The claw rotor (20) according to claim 13, wherein the securing clip (11) has an axial orientation in a free state, and is bent according to the bending line in a fitted state, when the crimping device is disposed in the radial cavity.

15. The claw rotor (20) according to claim 12, wherein the securing clip (11) comprises a bending line (60) disposed between the securing device (50) and the crimping device.

16. An electrical machine (10) comprising a claw rotor (20) according to claim 1.

17. A claw rotor (20) comprising:
a shaft (21);
a first magnet wheel (25) and a second magnet wheel (26) secured on the shaft (21);
a winding (17) provided with a coil insulator (27) and surrounded by the first and second magnet wheels (25, 26);
a collector provided with at least one collector ring (28, 29);
a fan (31) secured on the first magnet wheel (25) and disposed between the winding (17) and the at least one collector ring (28, 29);
at least one end wire (15, 16) of the winding (17) being connected to one of the at least one collector rings (28, 29), and passing through a radial cavity (35, 36) formed by a recess in the fan (31);
a securing clip (11) for securing one of the at least one end wires (15, 16) of the winding (17);
the securing clip (11) being secured on the coil insulator (27), and comprising a crimping device (62, 63) disposed in the radial cavity in order to crimp a part of the at least one end wire (15, 16) of the winding which extends in the radial cavity; and
the securing clip further comprising a support device (57, 58) for support on a wall of the radial cavity, such that the crimping device clamps the at least one end wire (15, 16) of the winding when the crimping device is disposed in the radial cavity (35, 36).

18. The claw rotor (20) according to claim 17, wherein the recess is in the form of a radial tunnel.

19. The claw rotor (20) according to claim 18, wherein the crimping device comprises an opening (55) in order to insert the part of the at least one end wire to be crimped, and wherein the support device (57, 58) comprises a protuberance (57) which extends from the opening (55) of the crimping device in the direction of a wall of the fan (31).

20. The claw rotor (20) according to claim 17, wherein the crimping device comprises an opening (55) for inserting the part of the end wire to be crimped, and wherein the support device (57, 58) comprises a protuberance (57) which extends from the opening (55) in the direction of a wall of the fan (31).

* * * * *